UNITED STATES PATENT OFFICE.

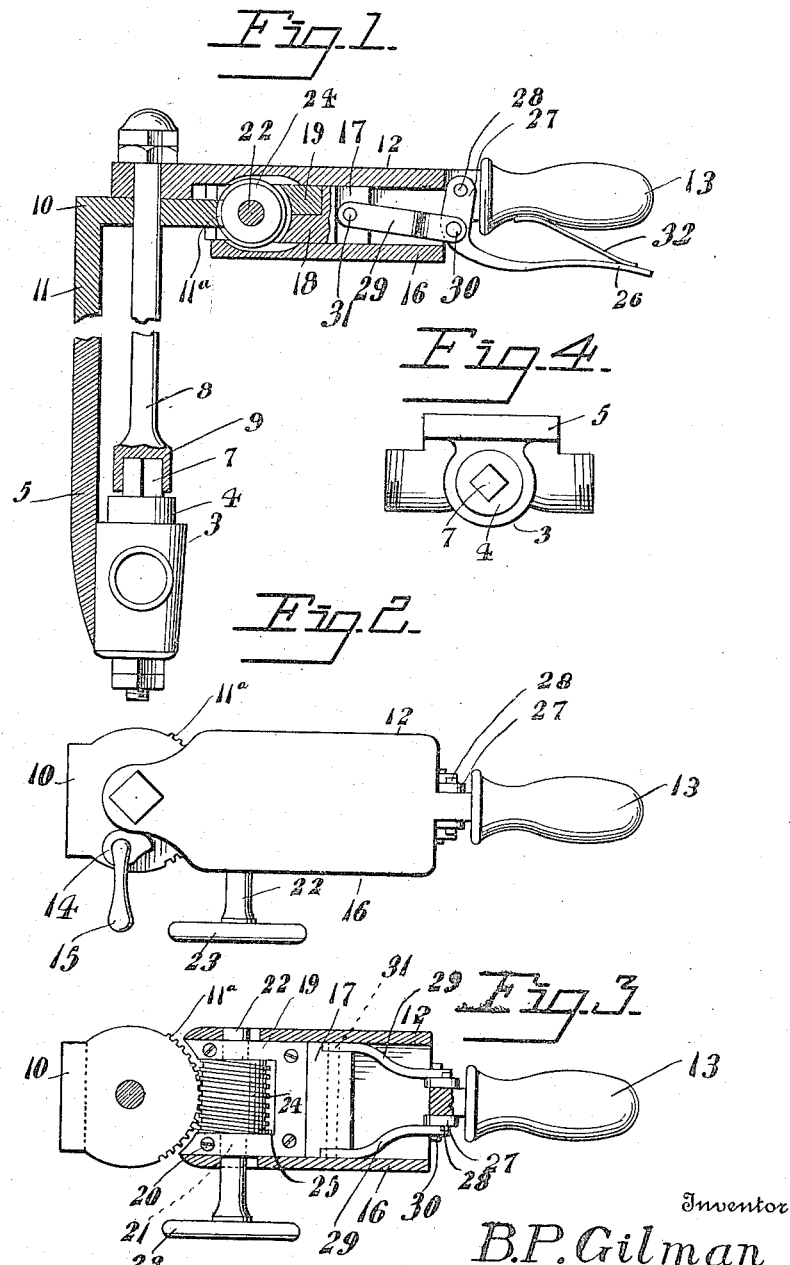

BENOIST P. GILMAN, OF YOAKUM, TEXAS.

FIRING-VALVE TO CONTROL THE FEED OF OIL IN FIRING OIL-BURNING LOCOMOTIVES.

1,226,504.      Specification of Letters Patent.      Patented May 15, 1917.

Application filed November 15, 1915. Serial No. 61,632.

*To all whom it may concern:*

Be it known that I, BENOIST P. GILMAN, a citizen of the United States, residing at Yoakum, in the county of Dewitt and State of Texas, have invented new and useful Improvements in Firing-Valves to Control the Feed of Oil in Firing Oil-Burning Locomotives, of which the following is a specification.

This invention relates to improvements in valves especially adapted for controlling the flow of fuel oil through pipes to burner and for hence controlling the feeding of the fuel oil to a burner where the fuel oil is consumed or used, the object of the invention being to provide a valve operating means whereby the valve may be very finely adjusted and prevented from being casually turned.

The invention consists in the construction, combination and arrangement of devices hereinafter described and claimed.

In the accompanying drawings:—

Figure 1 is partly an elevation and partly a vertical sectional view of a valve, and operating means therefor constructed and arranged in accordance with my invention.

Fig. 2 is a detail plan of the same.

Fig. 3 is a horizontal sectional view of the same on the plane indicated by the line A—A of Fig. 2.

Fig. 4 is a detail plan of the valve.

The valve consists of a casing 3 and a plug 4 which may be turned to open or cut off flow of fuel oil through pipes attached to the casing and to regulate the passage of fuel oil therethrough. This casing is provided with a supporting bracket 5 which should be bolted to the leg of the boiler. The plug has an annular head 7 at its upper end.

In connection with the valve, I employ an operating stem 8 which is here shown as vertically arranged and which is provided at its lower end with a socket 9 which is fitted on the head 7 of the plug. This stem extends upwardly and has a bearing in the horizontal segment arm 10 of a bracket 11 which should be bolted to the leg of the boiler; the segment arm 10 is provided with spur-teeth 11$^a$.

A lever 12 is attached to the upper end of the stem 8 and arranged to turn on the segment arm 10, said stem forming the pivot of the valve lever and the latter being provided at its outer end with a handle 13. A cam 14 is provided for locking the lever to the segment arm 10 at any desired point according to the desired adjustment of the plug 4 and the said cam as a clamping handle 15 by means of which it may be readily operated. On the under side of the valve lever is a guide casing 16 in which operates a block 17 which comprises a lower member 18 and an upper member 19, said members being secured together by screws 20. The said members are provided in their opposing sides with bearings 21 for an adjusting shaft 22. Said adjusting shaft has a hand wheel 23 at its outer end by means of which it may be turned to any desired extent and the said adjusting shaft also has an adjusting worm 24 which engages a gear or graduating teeth 11$^a$ of the segment arm 10. This worm revolves with the shaft 22 and is arranged in an opening 25 with which the parts of the block 17 are provided.

An operating lever 26 is provided for the block 17 to shift the latter longitudinally to engage or disengage the worm 24 with respect to the toothed segment 10. This operating lever is arranged on the under side of the handle 13 and has a forked angle iron 27 which is arranged astride of and pivotally connected to the outer portion of the securing valve lever, its pivot being indicated at 28. Links 29 connect the lever 26 with the worm shifting block 17, said links being pivoted to said lever as at 30 at a point a suitable distance from the lever pivot 28 and being pivotally connected to the lower member 18 of said block as at 31. A spring 32 is attached to the lever 26, bears against the under side of the handle 13 and normally depresses said lever 26 so as to cause it to hold the block 17 in the required position to keep the worm 24 engaged with the graduating teeth of the segment arm. When the worm gear is disengaged from the graduating teeth of the segment arm, the valve lever may be directly turned, to turn the stem 8, and hence also the plug, to approximately adjust the plug or to fix the latter in open or closed position. Grasping the handle 13 causes the lever 26 to disengage the worm, as will be understood, and the mere act of releasing the grasp on the handle 13 and lever 26 will permit the spring 32 to reëngage the worm with the teeth of the segment arm. Having thus approximately set the plug, the attendant by turning the worm 24 by means of the hand wheel 23 may cause said worm to coact with the toothed segment arm to finely adjust the plug so that the feed of fuel oil through the pipes may be exactly regulated as required. The clamping arm when set, prevents casual movement of any of the parts of the valve out of adjustment.

Having described the invention, what is claimed is:

In combination with a valve casing and a plug to control the passage of fuel oil therethrough, a stem connected to said plug and adapted to turn therewith, a bracket to which the valve casing is secured, said bracket having a segment arm provided with a segment rack, the upper portion of the said stem having a bearing in said segment arm, a lever attached to said stem and adapted to turn therewith and on the said arm, a block mounted in said lever for movement toward and from the segment arm, a worm having its bearings in said block and movable thereby into and out of engagement with the segment rack, an operating lever for the said block, and means to prevent the first-named lever from moving casually.

In testimony whereof I affix my signature in presence of two witnesses.

BENOIST P. GILMAN.

Witnesses:
A. F. KAUFFMANN, Jr.,
ROY YOUNG.

Copies of this patent may be obtained for five cents each, by addressing the "Commissioner of Patents, Washington, D. C."